Aug. 23, 1960 C. E. KENNEY ET AL 2,949,730

ELASTIC FLUID TURBINE TWO SPEED MOTOR CONTROL SYSTEM

Filed Feb. 25, 1957 2 Sheets-Sheet 1

Inventors
Clarence E. Kenney
Robert L. Moore
By Howard B. Scheckman
Attorney

Aug. 23, 1960 C. E. KENNEY ET AL 2,949,730

ELASTIC FLUID TURBINE TWO SPEED MOTOR CONTROL SYSTEM

Filed Feb. 25, 1957

Inventors
Clarence E. Kenney
Robert C. Moore
By Howard B. Scheckman
Attorney 2,949,730
Patented Aug. 23, 1960

2,949,730

ELASTIC FLUID TURBINE TWO SPEED MOTOR CONTROL SYSTEM

Clarence E. Kenney, Hartland, and Robert C. Moore, Wauwatosa, Wis., assignors to Allis-Chalmers Manufacturing Company, Milwaukee, Wis.

Filed Feb. 25, 1957, Ser. No. 641,883

4 Claims. (Cl. 60—1)

This invention relates to the operation of a multipole, multiphase, two winding induction motor. The induction motor is used to rotate the spindle of a turbine prior to placing the turbine in operation, or after it is taken out of operation.

A turbine is not placed in operation when it is cold. The elastic fluid would heat the spindle and turbine casing unevenly due to differences in thickness of the various parts and warpage of parts as well as thermal distortions would occur.

Similarly, when a turbine is taken out of operation, rotation of the spindle is not stopped. If rotation of the spindle were stopped, the spindle would not only sag as it cools, but thermal distortions would result due to different cooling rates caused by differences in thickness of the various parts.

For the above reasons it is customary to rotate the spindle while heating or cooling it before putting the turbine into, or taking it out of operation.

In prior art devices a single speed motor is used as the power source to rotate the spindle. See for example U.S. Patent 2,245,175. In the prior art devices, the single speed motor drives a speed reducing gear train that includes a planetary drive gear. The drive gear engages gear teeth provided on the spindle and rotates the spindle.

The drive gear is designed to automatically disengage from the spindle of the turbine whenever steam rotates the spindle faster than the drive gear is rotating. This provides a smooth change from motor drive to steam drive.

The trouble with a single speed motor is that unless a very large motor is used, there is not enough power to rotate the spindle faster than three or four r.p.m. At this speed although there is sufficient oil to lubricate the bearings the coefficient of friction is higher than if the shaft rotates at high speed. At a high speed of around twenty r.p.m. there is superior lubrication because the spindle itself will act as an oil pump in forming an oil film and decreasing the coefficient of friction. In addition, although the spindle will heat or cool uniformly at the slow speed of three or four r.p.m., the casing will not. This is because the spindle turns too slowly to evenly distribute the elastic fluid in the casing and cool or warm all the parts uniformly.

To bring the spindle up to high speed where the coefficient of friction is less and cooling or heating of the casing is more uniform, one solution has been to use additional oil pumps to force lubricate the bearings when starting. This reduces the coefficient of friction so the motor can bring the spindle up to high speed. At high speed the additional oil pumps are no longer required. However, as mentioned above, this requires the use of additional oil pumps and controls when starting the turbine.

Although the disadvantage of a single speed motor rotating at slow speed can be overcome by the use of a low and high speed gear train, the planetary drive gear makes the use of a low and a high speed gear train difficult. This is because the spindle rotates as a flywheel and applies torque to the drive gear causing it to disengage from the spindle in the time required to shift from low to high speed. A complicated gear shift system would be required to shift from low to high speed without disconnecting the motor from the gear train. This would be expensive, and difficult to service and maintain.

Use of a two speed motor will eliminate the need for a complicated gear shift system, and allow the use of a smaller motor. A multipole, multiphase, two winding induction motor can be designed to provide the desired ratio between starting and running torque. Additionally, the copper losses in the motor rotor are less where the load is brought up to speed in two steps using a multiple winding motor rather than a single winding motor.

However, it has not been possible until this invention, to use a two speed induction motor for this purpose. This is because the multiphase current cannot be quickly switched from the low to the high speed winding without causing severe arcing in the switching mechanism. This is due to residual magnetism in the poles. On the other hand if there is a delay in switching from the low to the high speed winding, to allow the residual magnetism to dissipate, the drive gear automatically disengages from the spindle.

It is an object of this invention to provide a method and a control system for operating a multipole, multiphase, two winding induction motor so that it can be switched from low to high speed without causing arcing or allowing the drive gear to disengage itself from the spindle of the turbine.

This invention embodies the steps of (1) supplying multiphase electrical current into the low speed winding of the two winding induction motor to provide a high torque to overcome friction and start the turbine spindle rotating; then (2) stopping said supply of multiphase electrical current and supplying single phase electrical current into the low speed winding for a short period of time to allow residual magnetism in the poles to dissipate while the motor continues rotating the spindle, so the drive gear will not disengage itself from the spindle; and then (3) stopping said supply of single phase electrical current to said low speed winding and supplying multiphase electrical current into the high speed winding to bring said spindle up to speed.

An advantage of such a method and control system is that the spindle can be brought up to speed with a smaller motor, and the use of additional lubrication pumps, or complicated gear shift systems avoided.

Other advantages and objects will appear from the following description considered in conjunction with the attached drawings, in which.

Figure 1:
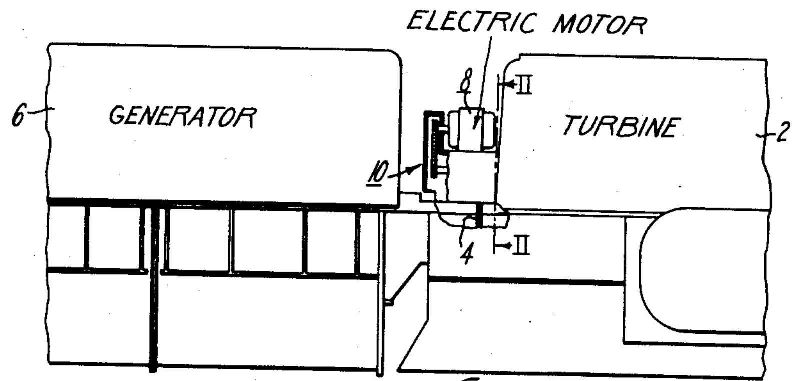
Fig. 1 is a side view of a turbine and generator showing the location of the induction motor and speed reducing gear train arrangement.

Referring to Fig. 1, there is disclosed a turbine 2 containing a spindle 4. Spindle 4 is connected to and drives generator 6. A multipole, multiphase, two winding induction motor 8 is located between turbine 2 and generator 6. Motor 8 rotates spindle 4 through a speed reducing gear train (indicated generally by arrow 10) to bring the spindle up to speed.

Figure 2:
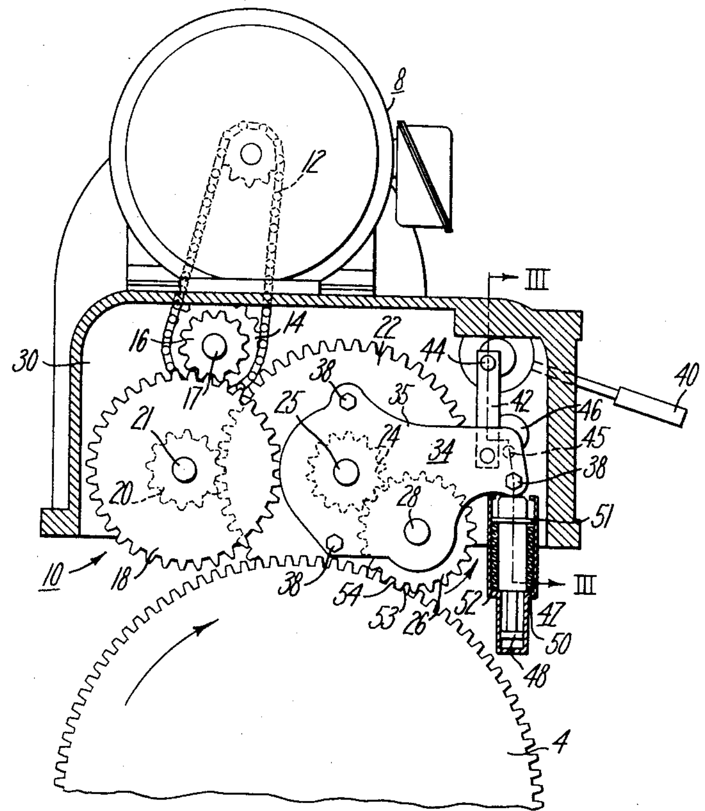
Fig. 2 is a section view of Fig. 1 taken in the direction of the arrows II—II, showing the speed reducing gear train.

Referring to Fig. 2, speed reducing gear train 10 comprises: chain 12 driving in turn, gears 14 and 16 fixed to shaft 17, gears 18 and 20 fixed to shaft 21, gears 22 and 24 fixed to shaft 25, and finally, planetary drive gear 26 fixed to and supported by shaft 28. Drive gear 26 is shown in driving engagement with spindle 4. Shafts 17, 21 and 25 are supported by a portion of frame 30.

Drive gear 26 is mounted in a movable cradle 34 so it can be moved into and out of engagement with spindle 4. The cradle comprises two spaced plates 35 that are bolted together by bolts 38. Spaced plates 35 rotatably support shaft 28 between them. Drive gear 26, while always remaining in engagement with gear 24, moves around gear 24 when cradle 34 is moved.

Figure 3:
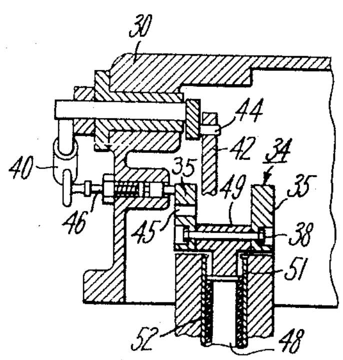
Fig. 3 is a sectional view of Fig. 2 taken in the direction of arrows III—III, showing the arrangement that moves the drive gear into engagement with the turbine spindle, and the arrangement that locks the drive gear out of engagement.

Any means may be provided for moving cradle 34 and drive gear 26 into engagement with the spindle. Referring to Figs. 2 and 3, in the embodiment disclosed, a lever 40 and link 42 move cradle 34. Cradle 34 pivotally carries link 42 that receives pin 44 eccentrically mounted in lever 40 rotatably supported in frame 30.

Rotating lever 40 clockwise (as viewed in Fig. 2) raises the cradle, while rotating the lever counterclockwise lowers the cradle and moves drive gear 26 into engagement with the spindle. Obviously an arrangement other than a lever and link can be used to move the cradle. For example, a hydraulic ram can be connected to and used to move the cradle.

Referring to Fig. 3, there is disclosed an arrangement for preventing accidental engagement of drive gear 26 with spindle 4. Cradle 34 is provided with an opening 45 which aligns with spring urged plunger 46 supported by frame 30. When drive gear 26 is disengaged from the spindle, plunger 46 automatically moves into opening 45 of cradle 34. This prevents drive gear 26 from being accidentally moved back into engagement with spindle 4, unless plunger 46 is first manually removed from opening 45.

It is desirable to provide a smooth driving engagement between drive gear 26 and spindle 4. For this reason cradle 34 is connected to dashpot 47 supported by frame 30. The dashpot contains a movable piston 48 that resists movement in the well known manner. Piston 48 is connected by sleeve 49 (Fig. 3) to bolt 38 of the cradle. Dashpot 47 contains a stop 50 which limits movement of piston 48 when gear 26 is fully engaged with spindle 4. Confined between stop 50 and an abutment 51 on piston 48, is spring 52. Spring 52 attempts to expand and opposes clockwise movement of cradle 34.

The dashpot operates in the following manner. When drive gear 26 engages the gear teeth on spindle 4 the pressure on the teeth of drive gear 26 is on front portion 53 (Fig. 2) of the teeth. Due to the large mass of the spindle, drive gear 26 climbs the spindle moving cradle 34 clockwise around shaft 25. Drive gear 26 will continue to climb the spindle until stop 50 prevents further clockwise movement of cradle 34 and forces gear 26 to rotate the spindle. Without the dashpot, drive gear 26 would jar into driving engagement with the spindle at the end of its climb. However, the dashpot and spring 52 force the drive gear to start the spindle rotating gradually near the end of its climb, rather than abruptly at the end of the climb. This provides a smooth drive engagement between drive gear 26 and spindle 4.

Drive gear 26 automatically disengages from spindle 4 when steam rotates spindle 4 faster than drive gear 26 is rotating. When steam drives the spindle, the pressure on the teeth of gear 26 changes. The pressure instead of being against front face 53 of the teeth, acts against back face 54 of the teeth. This causes drive gear 26 to rotate around gear 24 moving cradle 34 counterclockwise. Spring 52 aids this movement. The combined effect of spring 52, and spindle 4 rotating faster than drive gear 26, moves drive gear 26 out of engagement with spindle 4. This provides a smooth transition from motor to steam drive of the spindle.

This feature of the gear train, i.e., automatically disengaging when spindle 4 rotates faster than drive gear 26 rotates, is the thing which has made it so difficult to provide a two speed induction motor drive for the spindle. If there is a delay in shifting from the low to the high speed winding, the drive gear disengages from the spindle.

Figure 4:
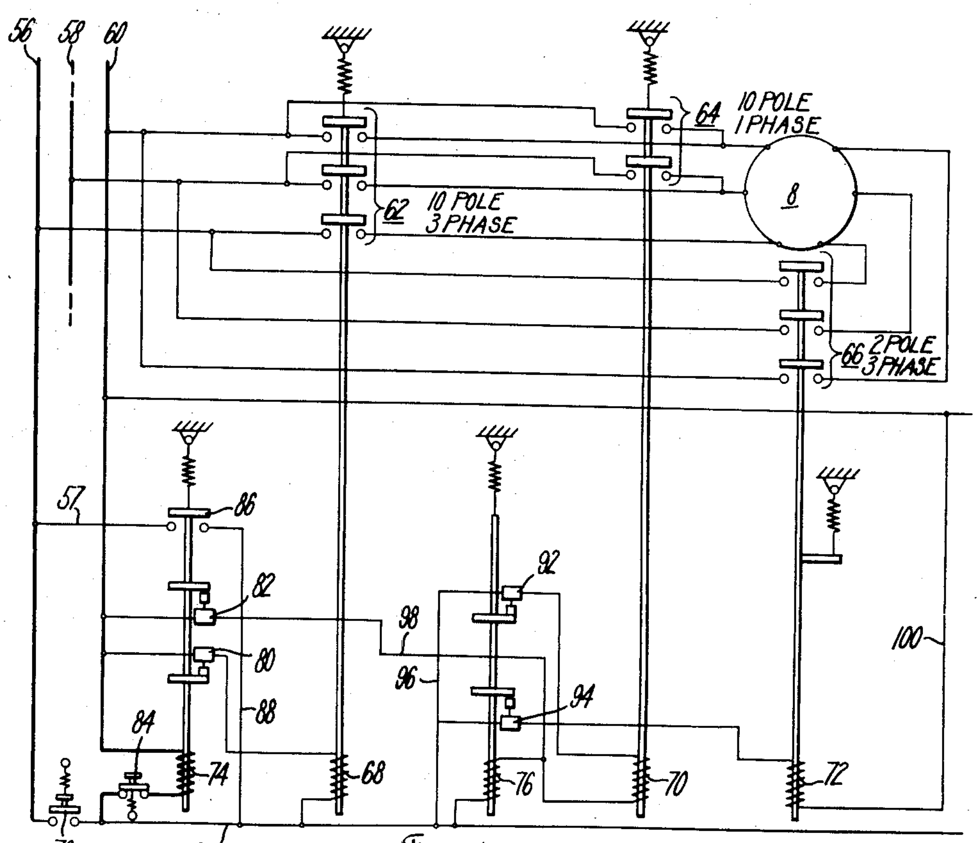
Fig. 4 is a wiring diagram illustrating the control system for the two winding induction motor shown in Fig. 1.

The present invention solves this dilemma. Referring to Fig. 4 there is disclosed a schematic wiring diagram of the control system for operating a multipole, two winding, two speed induction motor.

The induction motor selected to provide the desired starting and running torque is a three phase, five H.P. induction motor, containing a ten pole winding and a two pole winding. This provides the desired ratio between starting torque to start the spindle rotating at a speed of four r.p.m. and running torque to bring it up to a speed of twenty r.p.m.

Referring now to the schematic wiring diagram of Fig. 4, the control system and method will be more completely described. Wires 56, 58 and 60 interconnect motor 8 with an energizing means, in this embodiment a supply of three phase and single phase electricity.

Switch means are provided that are selectively operable to interconnect the low or high speed winding of said motor with said energizing means. The switch means may comprise three sets of contacts 62, 64 and 66 which make and break the circuit between the energizing means and induction motor 8 to control its operation.

When set of contacts 62 are closed, the low speed winding of motor 8 is connected to the multiphase energizing means. And motor 8 operates as a ten pole, multiphase induction motor. When set of contacts 62 are open and set of contacts 64 are closed, the low speed winding of the motor is connected to a single phase energizing means. And motor 8 operates as a ten pole, single phase induction motor. When set of contacts 66 is the set closed, the high speed winding of motor 8 is connected to the multiphase energizing means. And motor 8 operates as a two pole, multiphase induction motor.

Any control means can be provided to open and close sets of contacts 62, 64 and 66 and determine the length of time that the set of contacts remain open or closed. Or this can be done manually. In the embodiment described, contacts 62, 64 and 66 are opened and closed automatically by solenoids 68, 70 and 72, respectively, which are in turn operated by timing relays 80, 82, 92 and 94. The means actuating timing relays 80, 82, 92 and 94 are solenoids 74, 76.

Closing start switch 78 energizes solenoids 74 and 68. Solenoid 68 closes contacts 62 and starts the motor operating on ten poles, three phase. Solenoid 74 closes switch 86 and shorts out start switch 78 so it can be released, and also actuates timing relays 80 and 82 to control the length of time motor 8 operates on ten poles, three phase.

Start switch 78 completes a circuit to solenoid 74, through wire 56, start switch 78, normally closed switch 84, solenoid 74, and wire 60. Start switch 78 also completes a circuit to solenoid 68, through wire 56, start switch 78, wire 90, solenoid 68, closed timing relay 80 and wire 60.

The circuit to solenoid 74, when switch 84 is closed and start switch 78 is released, is through wires 56, 57, switch 86, wire 88, wire 90, switch 84, solenoid 74, and wire 60. The circuit to solenoid 68, when switch 84 is closed and start switch 78 is released, is through wires 56, 57, switch 86, wires 88 and 90, solenoid 68, closed timing relay 80, and wire 60.

Timing relay 80 is set to open the circuit of solenoid 68 after a thirty second delay, and timing relay 82 is set to energize solenoids 76 and 70 after said thirty second delay. The motor, during the thirty seconds that timing relay 80 is closed, exerts its maximum torque and starts the spindle rotating to bring it up to speed.

After the motor operates for thirty seconds on ten poles, three phase, it operates for ten seconds on ten poles, single phase. When timing relay 80 opens after thirty seconds, it deenergizes solenoid 68 opening set of contacts 62. Simultaneously timing relay 82 closes, energizing solenoid 76 and solenoid 70.

Solenoid 76 actuates timing relays 92, 94 which control the length of time the motor operates on ten poles, single phase. Timing relay 92 is set to open after ten seconds, and timing relay 94 is set to close after said ten seconds. Since timing relay 92 is already closed, energized solenoid 70 closes set of contacts 64. The circuit to solenoid 70 is through wires 56, 57, switch 86, wires 88, 90, 96, closed relay 92, solenoid 70, wire 98, closed relay 82, and wire 60. With contacts 64 closed the motor operates as a ten pole, single phase motor. This permits the residual magnetism in the motor to dissipate.

The motor, when operated on single phase, cannot produce the torque that it can when operated on three phase. It is pointed out, however, that the spindle is now rotating faster, friction is less, and less torque is required to maintain spindle rotation. Therefore, although less, the torque is enough to keep the spindle rotating, preventing the drive gear from automatically disengaging from the spindle.

After the motor has operated for ten seconds on ten poles, single phase, i.e., forty seconds since the motor has started, timing relay 92 opens and deenergizes solenoid 70, opening set of contacts 64. Simultaneously, timing relay 94 closes, energizing solenoid 72 closing set of contacts 66. The circuit to solenoid 72 is through wires 56, 57, switch 86, wires 88, 90, 96, timing relay 94, solenoid 72, and wires 100 and 60. The motor now operates as a two pole, three phase motor and rotates the spindle at high speed.

To stop the motor, normally closed switch 84 is opened. This deenergizes solenoid 74, opening switch 86 breaking the circuit to solenoid 72. Solenoid 72 opens contacts 66, stopping the motor.

Switch 84, naturally, is not opened until drive gear 26 has moved out of engagement from spindle 4.

In summary, the motor operates for the first thirty seconds as a ten pole, three phase motor. This provides a high torque that overcomes the friction of the spindle and starts the spindle rotating. The motor then operates for ten additional seconds as a ten pole, single phase motor. This allows the residual magnetism in the ten poles to dissipate, facilitating switching. At the end of the ten seconds the motor is operated as a two pole, three phase motor, to rotate the spindle at high speed.

Obviously the specific time periods involved in switching depends on such factors as the number of poles of the low speed winding and of the high speed winding, the horsepower of the motor, the weight of the spindle, etc. The time would depend on each specific application of the invention.

As mentioned earlier, the advantages of this invention are that the spindle can be brought up to speed with a smaller motor, and the use of additional lubricating pumps, or complicated gear shift systems avoided.

From the foregoing it will be apparent to those skilled in the art that the illustrated embodiment of the invention provides a new and improved method and control system for operating an induction motor. And it will be apparent to one skilled in the art that various changes and modifications may be made therein without departing from the spirit of the invention or from the scope of the appended claims.

What is claimed is:

1. A control system for operating a multipole, two winding induction motor to rotate the spindle of a turbine fast enough to maintain uniform temperature of the spindle and casing and facilitate oil lubrication, wherein said two winding induction motor has a low speed winding and a high speed winding, said induction motor driving said spindle through a speed reducing gearing arrangement that includes a drive gear that is in driving engagement with said spindle, said drive gear automatically disengaging from driving engagement with said spindle when said spindle rotates faster than said drive gear, comprising: a supply of multiphase and single phase electrical current, first, second and third switch means, control means closing said first switch means and interconnecting said supply of multiphase electrical current with said low speed winding to provide a high torque, said control means opening said first switch means stopping said supply of multiphase electrical current in said low speed winding after a predetermined period of time and simultaneously closing said second switch means interconnecting said supply of single phase electrical current with said low speed winding, to operate said motor during a second predetermined period of time to decrease residual magnetism in said poles of said multipole motor, and finally, said control means after said second predetermined period of time opening said second switch means stopping the supply of said single phase electrical current in said low speed winding and simultaneously closing said third switch means interconnecting said multiphase electrical current with said high speed winding to bring said motor up to high speed.

2. A control system for operating a multipole, two winding induction motor to rotate the spindle of a turbine fast enough to maintain uniform temperature of the spindle and casing and facilitate oil lubrication, wherein said two winding induction motor has a low speed winding and a high speed winding, said induction motor driving said spindle through a speed reducing gearing arrangement that includes a drive gear that is in driving engagement with said spindle, said drive gear automatically disengaging from driving engagement with said spindle when said spindle rotates faster than said drive gear, comprising: a supply of multiphase and single phase electrical current, first, second and third sets of switches, said first set of switches when closed interconnecting said supply of multiphase electrical current with said low speed winding, said second set of switches when closed interconnecting said supply of single phase electrical current with said low speed winding, and said third set of switches when closed interconnecting said supply of multiphase electrical current with said high speed winding, a first and second timing relay, means actuating said first and second timing relays, said first timing relay when actuated closing said first set of switches to provide a high torque, said first timing relay after a predetermined period of time opening said first set of switches, after opening of said first set of switches, said second timing relay being actuated closing said second set of switches to interconnect said supply of single phase electrical current with said low speed winding to decrease residual magnetism in said poles of said multipole motor, said second timing relay also operating a second actuating means which actuates a third and fourth timing relay, said third timing relay opening said second set of switches disconnecting said single phase supply from said low speed winding, and said fourth timing relay when said second set of switches are opened and closing said third set of switches to bring said motor up to high speed.

3. A control system for operating a multipole, two winding induction motor to rotate the spindle of a turbine fast enough to maintain uniform temperature of the spindle and casing and facilitate oil lubrication, wherein said two winding induction motor has a low speed winding and a high speed winding, said induction motor driving said spindle through a speed reducing gearing arrangement that includes a drive gear that is in driving engagement with said spindle, said drive gear automatically disengaging from driving engagement with said spindle when said spindle rotates fasten than said drive gear, comprising: a supply of multiphase and single phase electrical current, first, second and third sets of switches, said first set of switches when closed interconnecting said supply of multiphase electrical current with said low speed winding, said second set of switches when closed interconnecting said supply of single phase electrical current with said low speed winding, and said third set of switches when closed interconnecting said supply of multiphase electrical current with said high speed winding, a first and second timing relay, means actuating said first and second timing relays, said first timing relay when actuated closing said first set of switches to provide a high torque, said first timing relay after a predetermined period of time opening said first set of switches, said second timing relay when said first set of switches are opened simultaneously closing said second set of switches to operate said motor on single phase electrical current to decrease residual magnetism in said poles of said multipole motor, said second timing relay also simultaneously operating means actuating a third and fourth timing relay, said third timing relay opening said second set of switches after a second predetermined period of time, and said fourth timing relay when said second set of switches are opened simultaneously closing said third set of switches to bring said motor up to high speed.

4. In an apparatus for placing in operation a turbine having a steam driven spindle rotatable in a casing of a turbine; a multipole, two winding induction motor, wherein said two winding induction motor has a low speed winding and a high speed winding; a speed reducing gear train including a drive gear that is in driving engagement with said spindle, said speed reducing gear train interconnecting said induction motor and said spindle, said drive gear automatically disengaging from driving engagement with said spindle when said spindle rotates faster than said drive gear; the combination with said motor comprising a supply of multiphase and single phase electrical current for said induction motor, and first, second and third sets of switch means for selectively interconnecting said motor with either said supply of multiphase or single phase electrical current, said first switch means operable for a determined period of time to interconnect said supply of multiphase electrical current with said low speed winding to provide a high torque, said second switch means operable for a determined period of time to interconnect said supply of single phase electrical current with said low speed winding to decrease residual magnetism in said poles of said multipole motor, and said third switch means operable to interconnect said supply of multiphase electrical current with said high speed winding to bring said motor up to high speed.

References Cited in the file of this patent

UNITED STATES PATENTS

| | | |
|---|---|---|
| 2,245,175 | Bany | June 10, 1941 |
| 2,627,059 | Noddleman | Jan. 27, 1953 |
| 2,782,352 | Bakos | Feb. 19, 1957 |